April 14, 1959 G. O. CONNER 2,881,644
ANTIFRICTION TOOL GUIDING MEANS
Filed July 8, 1955 2 Sheets-Sheet 2
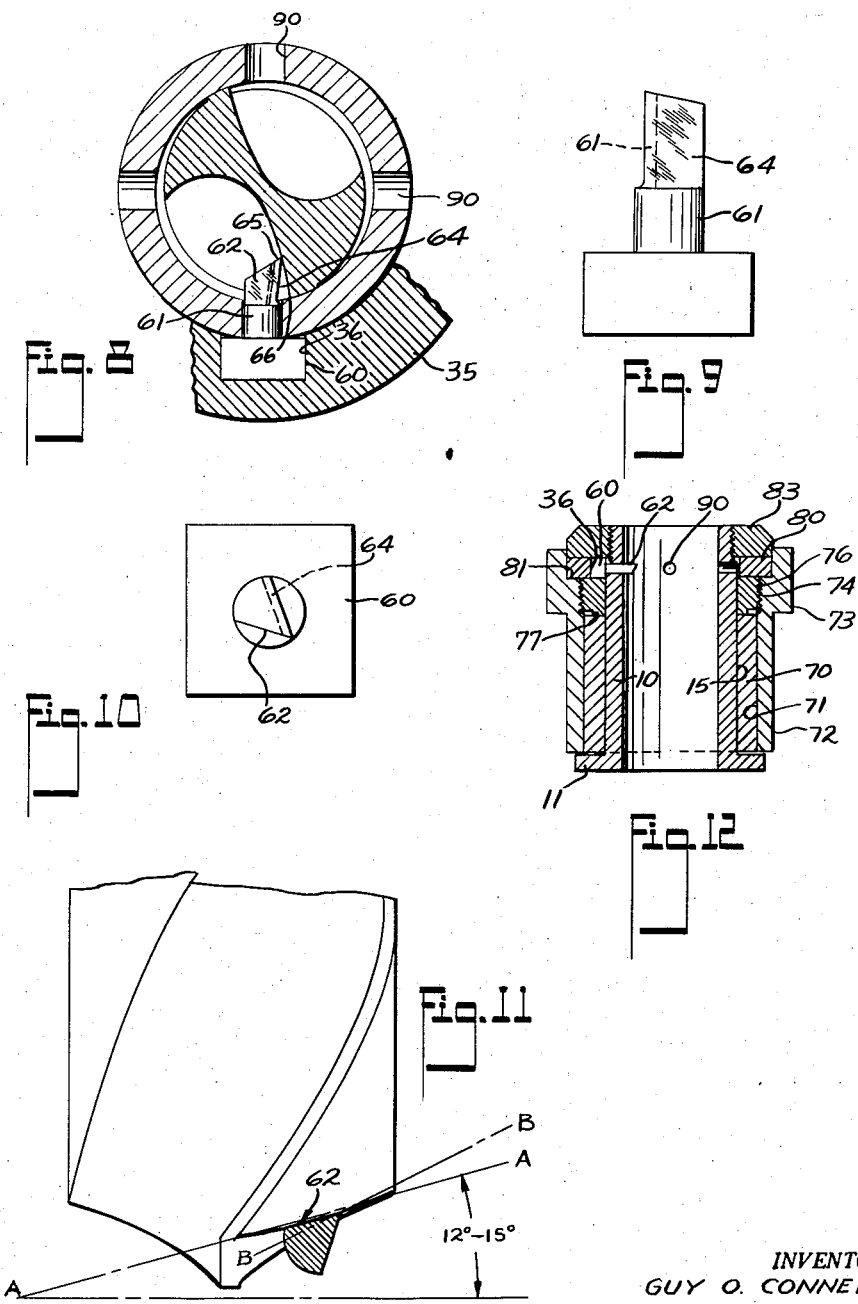
INVENTOR.
GUY O. CONNER
BY
J. D. Douglas
HIS ATTORNEY

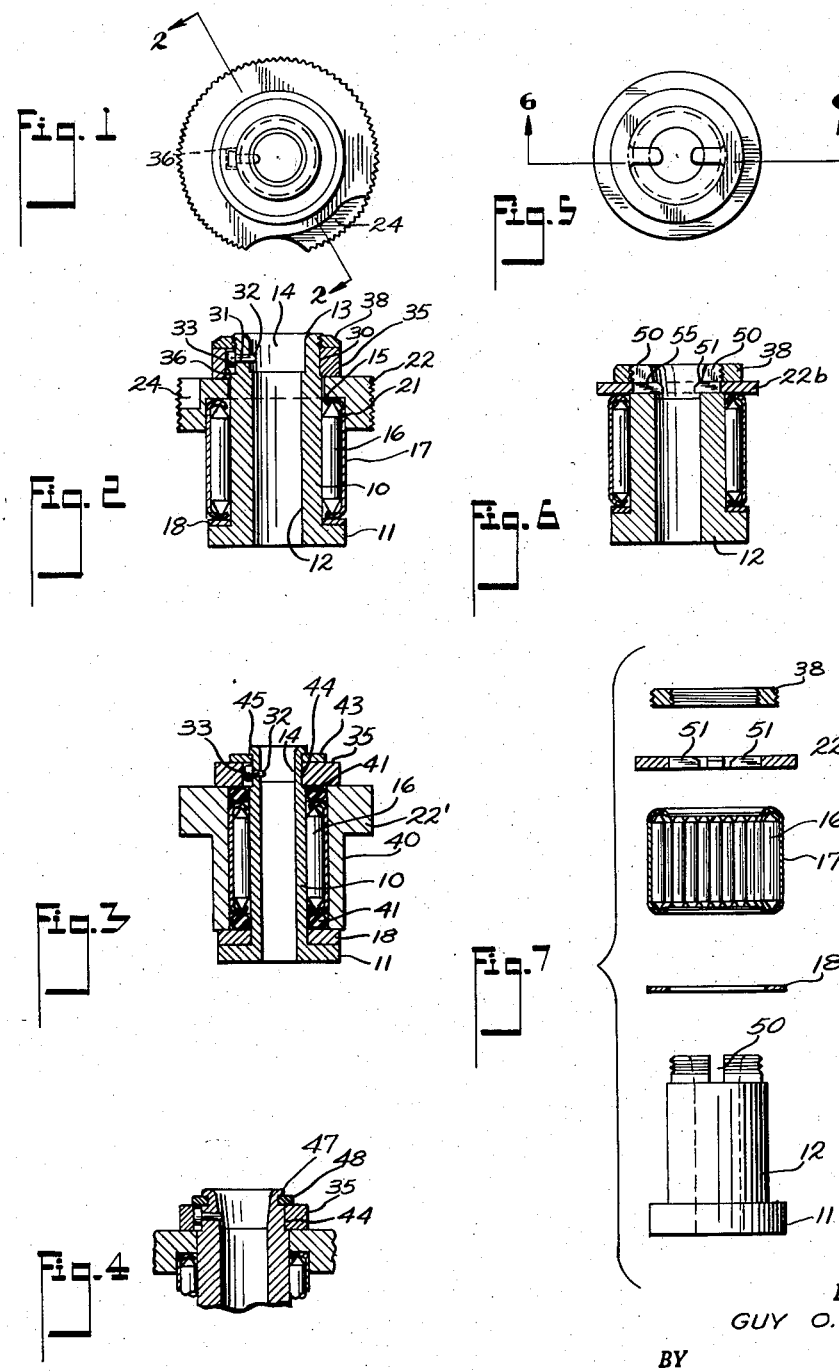

United States Patent Office 2,881,644
Patented Apr. 14, 1959

2,881,644

ANTIFRICTION TOOL GUIDING MEANS

Guy O. Conner, Cleveland Heights, Ohio

Application July 8, 1955, Serial No. 520,693

12 Claims. (Cl. 77—62)

This invention relates to improvements in drill bushings and more particularly to a drill bushing of the antifriction type.

As is well known to those versed in the art, it is common practice to provide guiding means, which may be removably inserted in a jig, to accurately guide the drills in predetermined positions for drilling a work piece.

The drill guides must be renewed frequently because the drills cause wear upon the guides and reduce the accuracy with which they can position the drills. Furthermore the guides wear the drill, particularly if they are made of a hardened material to prevent wear of the guides. When the drills are worn it is necessary to regrind the drills for the complete length of that portion of the drill that passes through the guides. Various attempts have been made to provide guides that will not wear the drills including certain antifriction devices where the interior guiding surface is revolvable in bearings. These devices however are not completely satisfactory because there is a certain amount of relative movement between the guiding portion and the drill which causes wear therebetween since the drill does not run at all times in driving relation with the guide. This results because the guiding sleeve must be made with a bore slightly larger than the drill in order that the drill may enter into the guide. When so made it frequently happens that the rotation of the inner guide is irregular.

There is a particularly large amount of wear when the drill is inclined at an angle upon entering the antifriction guide. In this instance it is common to find that the cutting edge of the drill is dulled or knocked off. If, however, the rotation of the guide can be made to start immediately upon entry of the drill in the guide, the cutting edge of the drill remains sharp and intact.

By the present invention there is provided an antifriction guide where the guiding means is supported in antifriction means and is forced to rotate with the drill at exactly the same speed of revolution, immediately upon the entry of the drill into the guide. There is a considerably increased life for both the drill and the guide. Furthermore it is possible to replace certain parts that do wear without replacing the entire guide. When I speak of the drills I also include within this terminology reamers, since the devices are equally useful for reamers as well as drills.

Briefly the invention comprises the provision of a tool guide having a rotatable inner sleeve, this sleeve having a projection on the interior guiding surface of the guide which engages in a flute in the tool and whereby the tool drives the sleeve.

In the drawings I have illustrated several modifications of the invention; it will be apparent that, with this disclosure, other modifications may be made, the drawings and specification being for the purpose of illustrating the invention more clearly rather than for limitation of the invention to the specific means shown.

In the drawings:

Fig. 1 is a top plan view of an antifriction drill guide of my invention;

Fig. 2 is a section on the line 2—2 of Fig. 1;

Fig. 3 is a similar view to Fig. 2 of a modification;

Fig. 4 is a fragmentary sectional view of the upper end of the device of Fig. 1 showing a modified form of locking device;

Figs. 5 and 6 are plan and sectional views respectively of another modification of my invention;

Fig. 7 is an exploded view of the device of Fig. 6 with certain parts shown in section;

Fig. 8 is a fragmentary top plan view of a sleeve with a driving pin useful in my invention illustrating how the driving engagement is affected;

Fig. 9 is a side view of the pin above taken from the right side as viewed in Fig. 8;

Fig. 10 is an end view of the pin;

Fig. 11 is a diagrammatic view showing the manner in which the pin cooperates with the end of a drill; and Fig. 12 is a vertical section of a modified form of drill guide.

As best shown in Figs. 1 and 2 a drill guide is provided which includes a drill guiding sleeve 10 having a flange 11 at its lower end and provided with a drill guiding bore 12. It will be appreciated that the guides will vary in size depending upon the size of the drill to be guided, it being understood that the bore 12 is of a size to provide a close sliding fit with the lands of the drill or the cutting edge of a reamer. The upper end of the sleeve 10 is provided with a flared mouth 13 and a slight counterbore 14. Instead of a counterbore, this portion may be tapered, being wider at the top and reducing in diameter to a point at approximately the bottom end of the counterbore. The exterior of the sleeve has a cylindrical surface 15 which provides a bearing surface for a needle bearing 16 housed in a casing 17. The lower end of the needle bearing casing resting on a thrust washer 18 which is seated on the flange 11.

A head ring member is provided in the form of a ring having a counterbore 21 for receiving the upper end of the bearing housing 17 and a knurled outer surface 22 for gripping purposes. This ring or head is also provided with a suitable notch 24 for cooperating with a pin on a jig to hold the bushing in place which type of construction is known in the art as a "slip renewable head."

Above the body 15 the sleeve is of slightly smaller diameter as shown at 30 and is provided with one or more apertures 31 through which the stem 32 of a pin having a head 33 may extend. The stem protrudes into the interior of the bore. A keeper ring 35 slips over the portion of a reduced diameter 30 and is provided with a notch 36 providing clearance for the head of the pin 33 and holds the pin in position in the bushing. The entire assembly is held together by an interiorly threaded lock ring or nut 38 threaded on the end of the sleeve 10.

The head ring counterbore 21 has a press fit with the bearing housing 17 and when inserted in a bore or recess of a jig normally does not move because of the locking of the head with the usual locking pin in a manner well known in the art.

Since the pin 32 extends into the bore sufficiently far to engage with the flute of the drill, when the drill passes into the bore, the inner sleeve 10 immediately rotates along with the drill in the needle bearing 16. In this manner there is no wear upon the drill or the bushing other than the normal wear of the needle bearing which, if properly lubricated, will run for an exceedingly long length of time. Should the pin 32 become worn it is a simple matter to renew the same at a relatively small cost by removing the threaded ring 38, lifting off the sleeve 35 and replacing the pin with a new one.

In places where it is desired to provide additional protection for the needle bearings against the ingress of dirt a bushing constructed as shown in Fig. 3 may be provided. In this instance there is again provided the inner sleeve 10 having an end flange 11 and a needle bearing 16. In this case however the head 22' has integral therewith a sleeve body 40 which extends for the full length beyond the ends of and houses the needle bearing. It also has a press fit with the bearing. Seated on the thrust washer 18 between the lower end of the needle bearing housing and the washer and between the lower end of the housing and the inner sleeve 10 is an O ring 41. Likewise at the top of the housing 40 is a second O ring 41 which is engaged between the inner sleeve 10 the outer sleeve and between the end of the bearing and the keeper ring. The O rings are held under compression by the keeper ring 35 which performs the same function as in the ring of the previous embodiment.

The sleeve 10 is of reduced diameter at 44 and receives the keeper ring above which is disposed a locking washer 43. The end of the sleeve is spun over at 45 to hold the assembly together.

When assembled the O rings are distorted to cause sufficient displacement of the rubber to provide a good seal to prevent the ingress of dirt and the egress of lubricant.

It will be noted that the wall thickness of the outer sleeve 40 enables a structure to be made where the needle bearing may be preloaded to thus decrease the play between the parts and increase the accuracy of the guide.

Fig. 4 shows a modified form of fastening which may be applied to the device of Fig. 2 or Fig. 3. In this case the keeper ring 35 is disposed on the reduced end 44 and adjacent the end of the sleeve there is provided a ring groove 47 in which a lock ring 48 may be disposed. The lock ring 48 may be any of the well known C rings but preferably is one as shown in my co-pending application Serial No. 519,427, filed July 1, 1955, for "Locking Ring."

Figs. 5, 6 and 7 show another modification of the invention wherein the guide sleeve 12 is provided with a pair of kerfs or slots 50 diametrically opposed to each other in the upper end and extending through the wall of the sleeve. Here I have illustrated a press fit bushing. In this case the head 22b is provided with a pair of inwardly extending lugs 51. The head is slipped over the end of the sleeve 12, the lugs passing down through the slots 50 until they engage the bottom of the slots, as shown in Fig. 6, after which the nut 38 is threaded in position. The lugs extend into the bore in position to engage in the flutes of a drill. Although I have illustrated two such slots and two lugs it is within the scope of my invention to provide one lug in one slot or, when occasion desires it, as many lugs as there are flutes in the drill.

In this type of bushing it is desirable that it may be tested as it is installed to make sure that the fit in the jig is not too tight. If it is too tight the bearing will bind and make it inoperative. Therefore I preferably knurl the ring 22b or the lock nut 38 or both so that the inner sleeve can be rotated by hand to determine the loading of the bearings.

I have found that it is desirable, for most efficient operation, to provide a particular formation for the drill engaging lugs which will assist in the engagement of the lugs with the flute of the drill without effecting excessive wear on the lug itself. To this end I find that if a lug is provided having a face opposite to the entering edge of the drill which face is inclined to the horizontal at an angle equal to or greater than the clearance angle of the end face of the drill, that the camming action, when the drill hits the lug endwise, results in a quicker, easier and smoother meshing of the lug in the flute of the drill. At the same time I have also found that if the driving face which contacts with the drill is undercut sufficiently so that it engages the drill in the flute back of the cutting edge, less wear occurs on both the drill and the lug. This structure adapts itself to all of the embodiments shown but is illustrated particularly in connection with the embodiments shown in Figs. 1 to 4.

In carrying out the above, the lug is provided with a square head 60 which is adapted to be engaged in the square notch 36 provided in the keeper ring 35. Preferably this notch and the head are a close enough fit so that there is relatively little turning movement of the pin during operation. The pin is provided with a stem 61 and the drill end engaging face at 62 is inclined, as stated, at an angle equal to or greater than the bottom clearance angle of the drill. This is best exemplified by Fig. 11 which is a diagrammatic view showing the end of a drill and wherein the clearance angle is indicated by the dotted and dashed lines A—A as being between 12° and 15°. The driving lug is shown in the section as having a face which meets with the end face of the drill the angle of inclination of this face being equal to that of the clearance angle of the drill. As shown by the dotted-dashed line B—B this face may have an angle greater than the clearance angle. In either event it will be seen that since the two faces are slanting that a camming action is exerted between the end of the drill and the pin as the drill passes into the bushing, the pin tending to slide off the end of the drill rotating the sleeve to cause the pin to enter into the next succeeding flute quickly and easily where it is picked up in the flute back of the cutting edge.

As shown in Fig. 8, the face which engages the flute is undercut at 64 so that the point 65 engages the flute back of the cutting edge 66 of the drill.

Figs. 3, 4 and 8 illustrate a single opening for the reception of the stem of the driving lug or pin. It will be appreciated that it may be desirable to have more than one opening in order that the pin may be moved to different positions as one side of the bushing becomes worn.

I contemplate that the needle bearings may be replaced with suitable substantially solid antifriction bearings such as "oilite" or "nylon."

Figs. 8 and 12 shows how the inner sleeve of a bushing may be provided with a plurality of holes 90 through any one of which the pin may extend.

The particular embodiment of Fig. 12 also illustrates another modification of the invention in that a different type of antifriction means is provided. In this case the drill guiding sleeve 10 has the usual flange 11 at the lower end, the outer surface 15 of the sleeve providing a bearing surface. Telescoped around the outside of the sleeve and extending opposite to the flange 11, but spaced therefrom, is a cylindrical bearing 70. This bearing is in engagement with the wall 71 of the housing 72. The housing 72 is provided with the usual head 73, and the inner surface opposite to the head is provided with a thread 74 which receives a threaded ring 76. The ring 76 is provided with an annular projection 77 on its lower end which abuts the upper end of the bearing 70. The keeper ring 80 in this instance is received within a counterbore 81 of the head ring 73 and has the usual notch 36 for the reception of the head 60 of the lug 62. The keeper ring is held in position by a threaded ring 83 disposed on the threaded upper end of the sleeve 10 and closes off the unused holes against the ingress of foreign material. If desired two or more pins could be used for engagement with the drill or tool.

I contemplate that the bearing member 70 be made of a material of pressed powder, such a material being on the market under the trade name of "oilite," this being the type of bearing requiring little or no lubrication.

I also contemplate that this bearing may be made of one of the well known plastics such as "nylon."

By the above structure a very economical form of bearing may be made having the antifriction characteristics and which, when wear occurs, may be quickly adjusted, by increasing the pressure with the nut 76, to compensate for that wear.

I also contemplate the omission of the flange 11 at the lower end and the substitution therefor of a groove 47 and lock ring 48 as described in Fig. 4. The groove would be spaced from the lower end of the bushing and the lock ring would be seated in the groove and take the place of the flange 11. Such a structure would be very economical in that the sleeve could be formed on a centerless grinder and there would be a minimum amount of material wasted in its formation.

It will be apparent that since in all cases the actual guiding surface rotates immediately upon entry of the drill that both the life of the drill and the bushing are increased.

Furthermore it will be seen that certain of the parts are exceedingly cheap, which reduces the cost of the device. The construction is such in all instances that replacement of the parts may be made which permits rebuilding of worn bushings at an exceedingly low cost.

Having thus described my invention, I am aware that numerous and extensive departures may be made therefrom without departing from the scope of the invention as defined in the appended claims.

I claim:

1. An antifriction drill guide bushing comprising a drill guiding sleeve and an antifriction bearing for supporting said sleeve, means to cause said sleeve to rotate with the drill comprising a projection extending inwardly from the guiding sleeve and engageable in the flute of the drill, and means removably mounted on said sleeve and retaining said projection in place thereon.

2. An antifriction drill bushing comprising a drill guiding sleeve having an elongated bore for guiding engagement with a drill having an inlet end and an outlet end, a support for the sleeve including antifriction bearing means disposed on the exterior of said sleeve, means on said sleeve to provide a driving engagement from the drill to the sleeve whereby the sleeve and drill rotate in unison comprising a projection carried by the sleeve and extending into said bore adjacent the inlet end thereof to engage in a flute of the drill, and means removably mounted on said sleeve and retaining said projection in place thereon.

3. An antifriction drill guiding bushing comprising a sleeve having a bore for guiding engagement with the lands of a drill, a support for the sleeve including antifriction bearing means disposed around said sleeve and supporting the sleeve for rotation with respect to said support, an opening through said sleeve beyond said support, a driving pin comprising a head disposed on the outside of the sleeve and a shank extending through said opening interiorly of the sleeve for engagement in a flute of a drill, a ring telescoped over the sleeve and formed with a recess for receiving the head of said pin, and locking means engaging the sleeve and locking said ring and said driving pin in position thereon.

4. A drill bushing as described in claim 3 where the driving pin is provided with a squared head and the recess in the ring is shaped to engage the squared head and prevent the pin from turning.

5. A device as described in claim 3 where the shank of the pin extends beyond the land of the drill and the end of the pin is arranged to engage in the flute of the drill inwardly with the shank out of contact with the edge of the land.

6. An antifriction drill guiding bushing including a drill guiding sleeve, a support for the sleeve including antifriction bearing means surrounding the sleeve, a plurality of openings in said sleeve adjacent one end, a pin including a head disposed on the outer side of the sleeve and a stem extending through one of said openings into the interior of the sleeve, and a ring mounted on said end of the sleeve and having a notch therein which receives the head of said pin and having a close fitting engagement with the sleeve away from said one opening to close the unusued opening against the ingress of foreign material.

7. A device as described in claim 6 where the head of the pin has squared surfaces and the notch in the ring is shaped to snugly receive the head of the pin to hold it against turning.

8. A drill guiding bushing comprising a drill guiding sleeve having an elongated bore, antifriction bearing means supporting the sleeve for rotation, housing means supporting said bearing means, said guiding sleeve having its bore flared outwardly at one end and formed thereat with a plurality of radial openings extending into the bore, at least one drill engaging pin comprising a head disposed on the outside of the drill guiding sleeve and a stem extending through one of said radial openings into the bore in the sleeve, a keeper ring mounted on said sleeve and having at least one recess the walls of which are formed for engagement with said head and the other portion of which closely surrounds the sleeve and closes off the other openings, and locking means on said end of said sleeve holding the ring in place.

9. A device as described in claim 8 where the pin has a face shaped for camming engagement with the end of the drill, and a driving face for engagement with the flute of the drill back of the cutting edge.

10. An apparatus of the class described including a drill guiding bushing having an elongated drill guiding bore having inlet and outlet ends, and a bearing supporting the bushing and arranged to be supported in a holder, said bushing having a projection extending inwardly into said bore adjacent said inlet end thereof and arranged for driving engagement with a drill, said projection being provided with an inclined surface for contact with the entering face of the drill and an undercut face on the side to form a portion for engagement in the flute of the drill back of the cutting edge, said bore having a length between said projection and its outlet end which is several times the spacing between its inlet end and said projection.

11. An apparatus of the class described including a drill guiding bushing having an elongated drill guiding bore having inlet and outlet ends, and a bearing supporting the bushing and arranged to be supported in a holder, said bushing having a projection extending inwardly into said bore adjacent said inlet end thereof and arranged for driving engagement with the drill, said projection being formed with an undercut face on the side toward the flute to form a portion for engaging the flute of the drill back of the cutting edge, said bore having a length between said projection and its outlet end which is several times the spacing between its inlet end and said projection.

12. An apparatus of the class described including a drill guiding bushing having an elongated drill guiding bore having inlet and outlet ends, and a bearing supporting the bushing and arranged to be supported in a holder, said bushing having a projection extending inwardly into said bore adjacent said inlet end thereof and arranged for driving engagement with the drill, said projection being provided with an inclined face for engagement with the end of the drill, the inclination of the face being at least as great as the bottom clearance angle of the drill, said bore having a length between said projection and its outlet end which is several times the spacing between its inlet end and said projection.

References Cited in the file of this patent

UNITED STATES PATENTS 2,507,204    Giern et al. _____ May 9, 1950

FOREIGN PATENTS 373,746    Great Britain _____ June 2, 1932